United States Patent [19]

Ludlow

[11] 3,725,934
[45] Apr. 3, 1973

[54] COLLISION WARNING INDICATOR

[76] Inventor: David L. Ludlow, P.O. Box 342, Oak Harbor, Wash. 98277

[22] Filed: May 28, 1971

[21] Appl. No.: 147,781

[52] U.S. Cl............343/112 CA, 343/102, 343/113 R
[51] Int. Cl................................G01s 3/00, G01s 5/02
[58] Field of Search.............343/112 CA, 113 R, 102

[56] References Cited

UNITED STATES PATENTS

| | | | |
|---|---|---|---|
| 3,345,633 | 10/1967 | Runge | 343/112 CA |
| 2,939,135 | 5/1960 | Beckerich et al. | 343/112 CA |
| 3,173,137 | 3/1965 | Byrne | 343/112 CA |
| 3,089,139 | 5/1963 | Hovannesian et al. | 343/112 CA |
| 3,563,651 | 2/1971 | Alvarez et al. | 343/112 CA |
| 3,611,371 | 10/1971 | Morse | 343/112 CA |
| 3,611,385 | 10/1971 | McHenry | 343/112 CA |

Primary Examiner—Benjamin A. Borchelt
Assistant Examiner—R. Kinberg
Attorney—Clarence A. O'Brien and Harvey B. Jacobson

[57] ABSTRACT

A train of output pulses from a pulse repetition generator is split into two pulse groups for modulating signal energy radiated forwardly and rearwardly from a moving craft in a collision warning system. Receiving antennas arranged in a circumferential sector array on each craft, pick-up signal energy within sector zones from approaching or overtaken craft to energize directional sector lamps on an indicator panel. Pulse recognizing circuits limit response of the lamps to pulse modulated signal energy in such a manner that a warning is provided only if approaching or overtaken craft are within overlapping sector zones.

17 Claims, 7 Drawing Figures

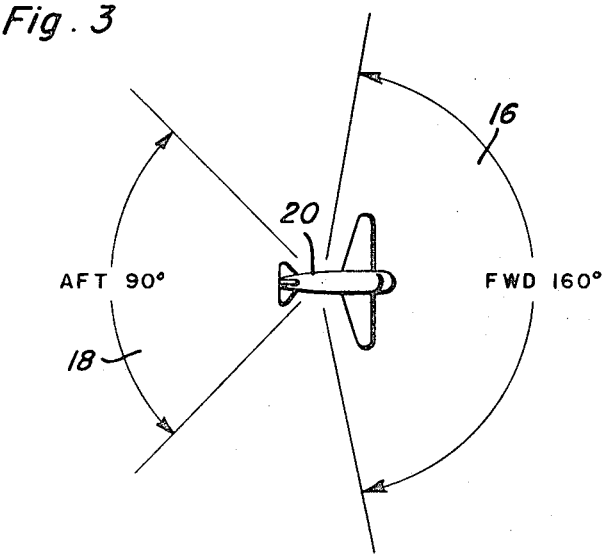
Fig. 3
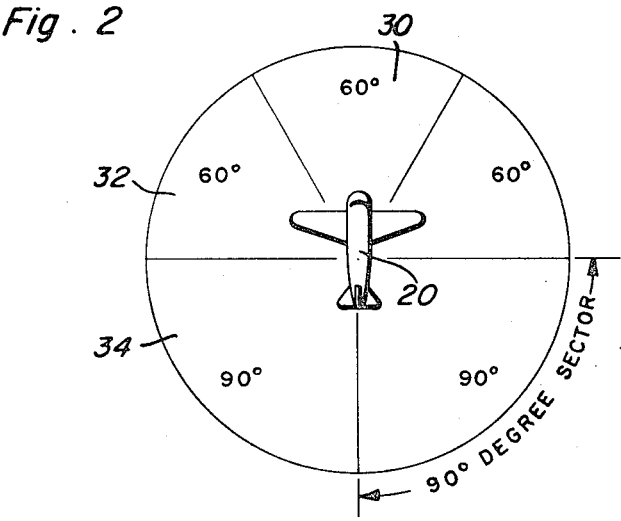
Fig. 2
Fig. 4
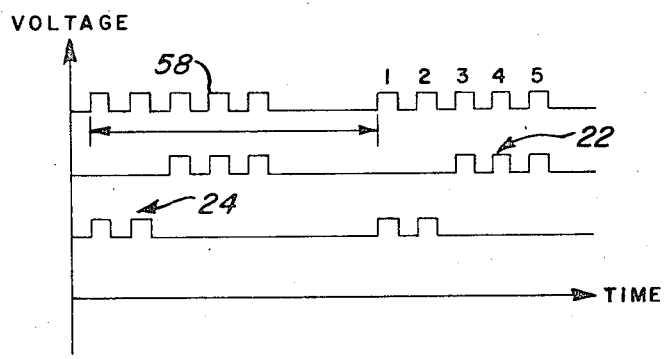
David L. Ludlow

David L. Ludlow
INVENTOR.

BY Clarence A. O'Brien
and Harvey B. Jackson
Attorneys

COLLISION WARNING INDICATOR

This invention relates to an electronic collision warning system for aircraft or the like.

Generally, collision warning systems involving apparatus carried solely by the aircraft, utilize omnidirectional antennas and distinguish between approach and departure by use of an encode, decode and comparison procedure. Such collision warning systems are relatively complex and subject to false alarms unless further complexities are introduced. Further, many of such systems involves mechanically moving parts, have slow response characteristics and are limited in the number of aircraft and azimuth sectors capable of being handled in a single potential collision situation.

It is therefore an important object of the present invention to provide a collision warning system utilizing directional transmitting and receiving antennas in order to avoid the complexity of signal coding, decoding and comparing and yet distinguish between departure and approach as well as to provide a directional indication.

A further object of the present invention is to provide a collision warning system that is comparatively simple and reliable.

In accordance with the present invention, each aircraft equipped with collision warning apparatus, will have at least two antennas from which directional signal energy is radiated forwardly and rearwardly of the moving craft. The signal energy respectively radiated forwardly and rearwardly of the craft is pulse modulated by different pulse patterns for pulse coded identification of the different directions. The pulse patterns modulation of the forwardly radiated signal energy is adapted to trigger directional indicator lamps when picked-up by receiving antennas of another craft equipped with the collision warning apparatus. The receiving antennas are arranged in a sector array centered at the craft. The pulse pattern rearwardly radiated from a transmitting antenna triggers an indicator when the carrier signal is picked-up by a forward sector receiving antenna in order to distinguish between an approaching and an overtaking situation should two or more aircraft be on potential collision courses. The indicator panel in addition to mounting the indicator lamps providing a directional indication of a potential collision situation, also features an audible alarm in order to attract the pilot's attention. By virtue of the pulse recognizing logic circuits, false alarms are avoided particularly where two aircraft are close to each other but not on a possible collision course. The collision warning apparatus also features test facilities and mode selection means whereby the reception range may be extended or the audible alarm silenced in favor of a continuous visual alert.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is a schematic top plan view of the receiving antenna radiation pattern associated with the collision warning apparatus;

FIG. 3 is a schematic top plan view of the transmitter antenna radiation pattern;

FIG. 4 is a graphical illustration of the pulse patterns associated with the system of the present invention;

Figure 1:
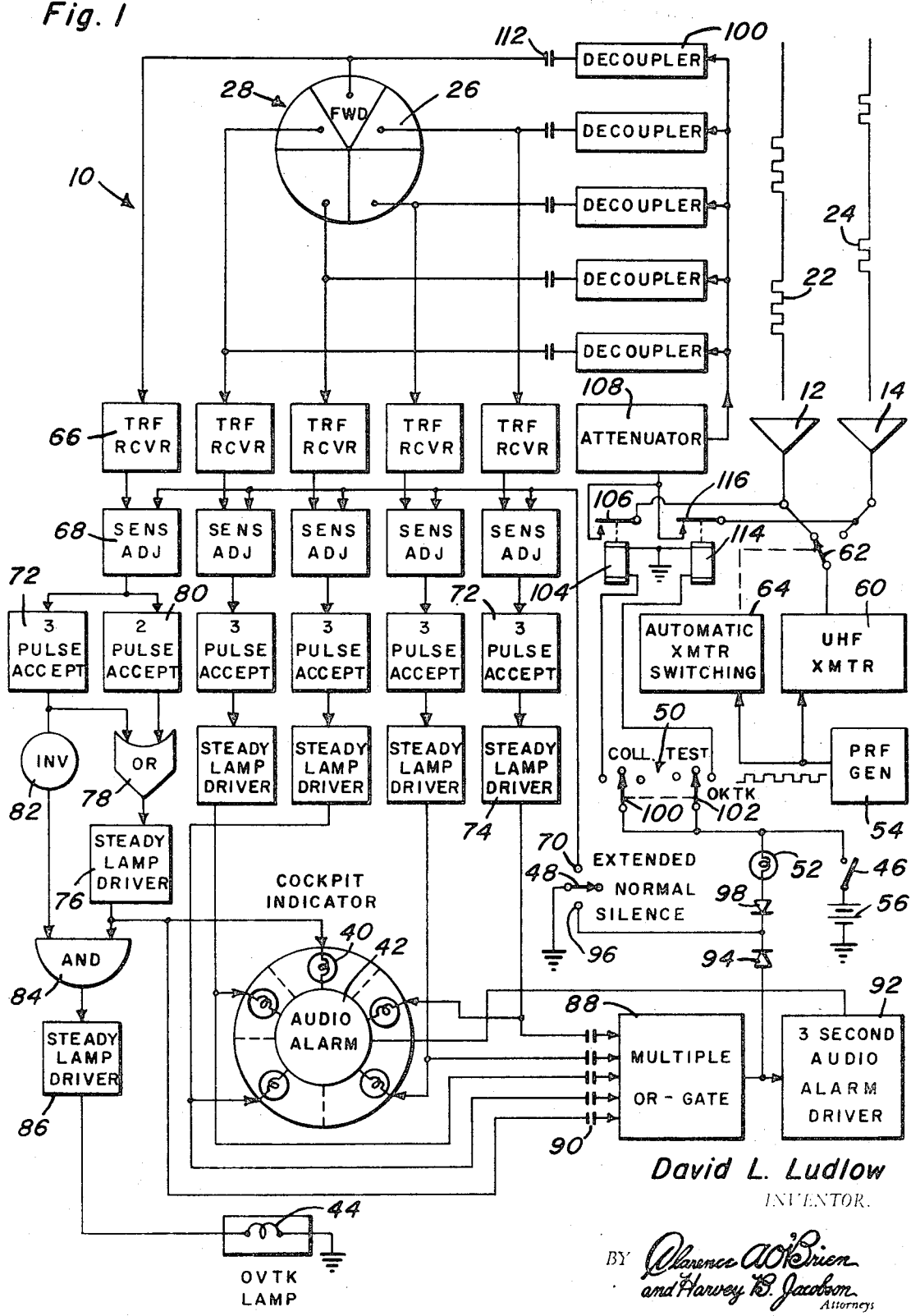
FIG. 1 is an electrical circuit diagram corresponding to the collision warning apparatus mounted on one craft.

Referring now to the drawings in detail, FIG. 1 illustrates the collision warning apparatus of the present invention generally referred to by reference numeral 10. The apparatus includes a forward antenna 12 and an aft antenna 14. The antennas may be mounted either atop the vertical fin or the fuselage just aft of the cockpit on the aircraft. These antennas, as will be further explained hereafter, respectively radiate directional signal energy at the same carrier frequency. In one embodiment of the invention, the signal energy radiated by the forward antenna 12 is confined to a forward sector zone 16 of 160° as viewed in a horizontal plane illustrated in FIG. 3 while the aft antenna radiates its signal energy within a 90° sector zone 18 rearwardly of the craft 20. Further, the signal energy respectively radiated by the transmitting antennas 12 and 14, are pulse modulated by different pulse patterns. In the embodiment illustrated, the pulse modulation associated with the transmitting antenna 12 consists of groups of three pulses 22 repeated at a predetermined repetition rate while the signal energy radiated from the aft antenna 14 is pulse modulated by groups of two pulses 24 at the same repetition rate. Since the antennas radiate signal energy alternately, as will be explained hereafter, the groups of pulses 22 and 24 are out of phase with each other.

The apparatus 10 also includes a plurality of receiving antennas 26 mounted in a circumferential sector array 28 which is centered at the aircraft and corresponds to reception sector zones as diagrammatically illustrated in FIG. 2. In the illustrated embodiment, receiving antennas 26 are shown receiving signal energy at the carrier frequency of the signal energy radiated from the transmitting antennas within sector zones as shown in FIG. 2 consisting of a forward sector zone 30 of 60°, two side sector zones 32 of 60° and two rear sector zones 34 of 90° each.

Figure 6:
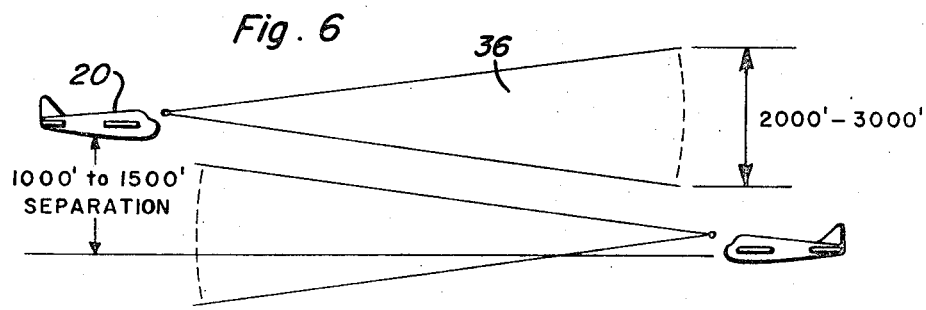
FIG. 6 is a simplified diagrammatic view of the vertical transmitted radiation patterns associated with approaching aircraft.

FIG. 6 diagrammatically illustrates in a vertical plane, the vertical radiation zones 36 which in one embodiment of the invention, effectively extend from each aircraft a distance of 5 miles in a normal operational mode of the collision warning system. At a 5 mile distance from the aircraft, the vertical radiation zone 36 is approximately 2,000–3000 feet. Accordingly, there will be no overlap of radiation zones capable of providing a collision warning as long as approaching aircraft are vertically separated by a distance exceeding 1,000–1,500 feet as diagrammatically shown in FIG. 6.

Figure 5:
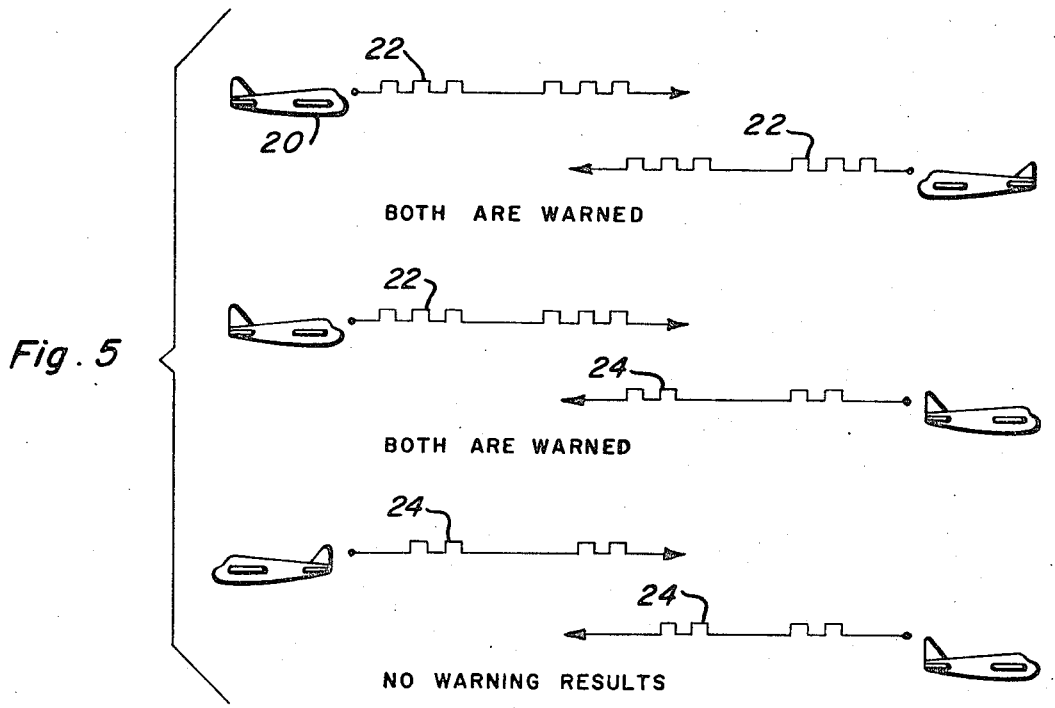
FIG. 5 is a simplified diagrammatic view of the different operational relationships between adjacent aircraft.

As hereinbefore indicated, the transmitting antennas 12 radiate a pulse pattern 22 so that when approaching aircraft are on a collision course as depicted on the top portion of FIG. 5, both aircraft will be warned by recognition of the signal patterns 22 through the receiving antennas 26 on each aircraft. When one aircraft is overtaking the other as shown in the middle portion of FIG. 5, both aircraft are also warned by appropriate recognition of the two different pulse patterns 22 and 24. As will be explained hereafter, the warning system distinguishes between an approaching and an overtaking situation. The lowermost portion of FIG. 5, shows a situation in which aircraft are departing from each other and wherein only the pulse patterns 24 are received by the respective aircraft to provide no warning.

Figure 7:
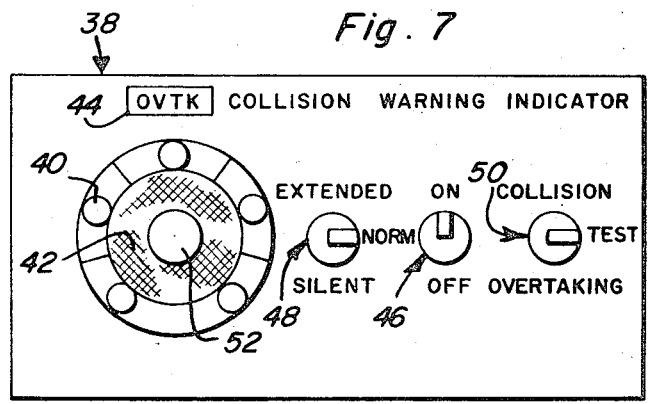
FIG. 7 is a front elevational view of the indicator and control panel associated with the collision warning apparatus of the present invention.

FIG. 7 illustrates the indicator and control panel generally referred to by reference numeral 38. The panel mounts a plurality of visual indicator lamps 40 circumferentially arranged in a sector pattern corresponding to the receiving radiation sector zones 30, 32 and 34 as shown in FIG. 2. The indicator lamps 40 on the panel surround the circular grill of an audible alarm device 42. Thus, when any one or more of the indicator lamps 40 is illuminated, the pilot will have a directional indication of an adjacent aircraft which is on a potential collision course. Whenever at least one of the indicator lamps 40 is illuminated, the audible alarm device 42 is sounded for a period of limited duration such as 3 seconds in order to obtain the attention of the pilot. The indicator lamps 40 however remain illuminated until the collision situation is removed. Also mounted above the sector array arrangement of indicator lamps 40 is an additional indicator lamp 44 which when illuminated, will signify to the pilot that his aircraft is overtaking another. The indicator lamp 44 is associated with the forward sector zone. If only the forward sector lamp 40 is illuminated, this will signify that the other aircraft is approaching on a collision course.

The collision warning apparatus is placed into operation by means of the "on-off" switch 46 also mounted on the panel 38 between a mode selection switch 48 and a test switch 50. When the mode selection switch 48 is displaced upwardly from its normal position as shown in FIG. 7, the reception range of the receiving antennas may be extended from the nominal 5 mile distance to the maximum capability of the apparatus. When the mode selection switch 48 is displaced downwardly to its other operative position, the audible alarm device 42 will be disabled. However, a red alerting lamp 52 will be continuously illuminated in the latter operational position of the switch 48.

The test switch assembly 50 when displaced upwardly from its illustrated position, will test the approach collision warning capability of all receiving sectors of the apparatus as well as the transmitter section. When the switch assembly is displaced to its lower most position, the ability of the apparatus to distinguish between an approaching and overtaking situation will be tested.

Referring once again to FIG. 1, the transmitter section includes a repetition pulse generator 54 connected to the output terminal of a suitable voltage source 56 by means of "on-off" switch 46. The pulse generator is of the type which produces output pulses 58 of fixed width and spacing as graphically shown in FIG. 4. In the illustrated embodiment, five pulses 58 form an output pulse train which is repeated at a determined repetition rate. These pulses are adapted to modulate the directional carrier signal output of an ultra-high frequency (UHF) transmitter 60 to which the pulse generator is connected as shown in FIG. 1. The pulse modulated output of the transmitter 60 is alternately fed to the forward and aft transmitters 12 and 14 through a switch 62. The switch is oscillated between its two operative positions by means of a transmitter switch component 64 to which the output of the pulse generator 54 is connected in order to control its switching rate. Accordingly, the train of output pulses 58 modulating the carrier signal output of the transmitter 60 is split into the two groups of pulses 22 and 24 respectively radiated by the forward and aft transmitting antennas at the same repetition rate.

With continued reference to FIG. 1, each of the receiving antennas 26 assigned to one of the receiving sectors, is connected to a tuned radio frequency receiver 66. Each of the receivers 66 is identical and are fixed tuned to the UHF operating frequency and contains a pulse detector. Associated with each receiver 66 is a sensitivity adjustment circuit 68 through which the sensitivity threshold of the receivers are nominally adjusted for reception of pulses at a distance of 5 miles as aforementioned. The sensitivity adjustment may be extended to the maximum capacity of the receivers by grounding of the adjustment circuits 68 through the mode selection switch 48 when displaced into engagement with the contact 70 corresponding to the range extension position. It will, of course, be appreciated that the output level of the transmitter section must be adjusted or calibrated to a predetermined power level in order to match the nominal 5 mile range capability of the warning system.

The pulse patterns modulating the signal energy detected by the receivers 66 are recognized by solid state logic circuits 72 respectively connected to each of the sensitivity adjustment circuits 68. Pulse code recognition logic devices programmed to recognize any desired pulse sequence are well known, as disclosed, for example, in U.S. Pat. No. 3,360,777 to Kolm. Such logic devices are designed to accept the coded pulse group 22 when at least two of such pulse groups are received at the predetermined repetition rate of the transmitter section. Each of the logic circuits 72, except for the one associated with the forward sector receiving antenna, is directly connected to a steady lamp driver 74. Driver circuits operative in response to predetermined input pulses to energize a lamp or the like are well known as disclosed, for example, in U.S. Pat. No. 2,275,930 to Torcheux. Accordingly, when two groups of pulses 22 are accepted by a logic circuit 72, its associated driver 74 will energize a corresponding indicator lamp 40 to which the driver is connected. In the case of the logic circuit 72 associated with the forward sector receiving antenna, its associated driver 76 is connected thereto through an OR-gate 78 in order to energize the forward sector indicator lamp whenever this logic circuit accepts two groups of pulses 22 at the predetermined repetition rate. Further, the driver 76 is operative to energize the forward sector indicator lamp whenever a second logic circuit 80 also associated with the forward sector receiving antenna accepts two groups of pulses 24 at the predetermined repetition rate. Accordingly, the forward sector lamp 40 will be energized whenever the aircraft is approaching another aircraft "head-on" or is overtaking another aircraft on a collision course. When the aircraft is overtaking another, the logic circuit 80 associated only with the forward sector receiving antenna will be operative to supply output signals to the OR-gate 78. The logic circuit 72 associated with the forward sector is not conditioned so its output will be negative. The inverter 82 inverts this negative output to a positive signal applied to one input of AND-gate 84 to which the positive output of the driver 76 is also fed. Accordingly, the AND-gate 84 will operate the driver 86 in order to energize the overtake indicator lamp 44 so as to distinguish between the two collision situations as described with respect to FIG. 5. The overtake lamp 44 is not to be illuminated during the "head-on" approach situation since the forward sector logic circuit 72 is conditioned to provide a positive output signal to the OR-gate 78 and the inverter 82. The inverted negative output of the inverter 82 will then inhibit the AND-gate 84 maintaining the overtake lamp extinguished.

Whenever any of the drivers 74 and 76 are rendered operative to energize an associated indicator lamp 40, it opens the OR-gate 88 through a blocking capacitor 90 in order to supply an operating signal to the audio alarm driver 92 through which the alarm device 42 is energized for a limited duration of 3 seconds, for example. In order to prevent operation of the audible warning device through the mode selection switch 48 in its silencing position, the output of the OR-gate 88 is grounded through diode 94 connected to the contact 96 engaged by the grounded mode selection switch 48. In this position of the switch 48, ground is applied through the diode 98 to one side of the alerting lamp 52, the other side being connected to the output terminal of the source of voltage 56. The alerting lamp 52 is accordingly energized in order to signify to the pilot that the audible alarm device 42 has been silenced.

The aforementioned testing of the collision warning apparatus is effected upon closing of the "on-off" switch 46 connecting the voltage source 56 to the switch sections 100 and 102 associated with the test switch assembly 50. Displacing test switch 50 to the collision position renders switch section 100 operative to energize the relay coil 104 thereby closing its normally open relay switch 106 connecting the forward antenna 12 to an antenuator 108. The antenuator therefore conditions the signal associated with the forward antenna 12 and feeds it through antenna decouplers 110 and signal coupling capacitors 112 to the inputs of the receivers 66. Accordingly, the receivers will be operative to detect the carrier signal modulated by the pulse groups 22 in order to test the capability of the apparatus in this regard. When the test switch 50 is displaced to the overtaking position, switch section 102 is closed to energize relay coil 114 closing its normally open relay switch 116 thereby connecting the aft antenna 14 to the antenuator 108. The capability of the apparatus with respect to the handling of pulse groups 24 may then be tested. Further, by means of the test switch section, the operating condition of the transmitter section including components 54, 60, 62 and 64 will be tested.

It will be apparent from the foregoing description, that the collision warning apparatus of the present invention will sound an audible warning to alert the pilot of approaching aircraft from any direction within a predetermined range, with the visible indication remaining as long as the collision situation exists. Further, the indicator display will distinguish between an approaching and overtaking situation and because of the indicator lamp arrangement will indicate possible collision with respect to more than one aircraft at the same time. By virtue of the pulse modulation arrangement described, false alarms are avoided and receiving equipment and logic equipment simplified. The audible alert may be silenced without removing the visual bearing information as a convenience for the pilot when traveling in a congested airport vicinity. A steady red light will inform the pilot of the silenced condition of the audible alarm in this operational mode. The apparatus furthermore provides an extended warning range capability as well as self-test facilities.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a collision warning system for moving craft wherein each of said craft has a plurality of transmitting antennas radiating directional signal energy forwardly and rearwardly of the craft and a plurality of receiving antennas arranged for reception of directional signal energy from an external source within circumferential sector zones centered at the craft, said external source being the transmitting antennas on another of the craft of the system, transmitter means connected to said transmitting antennas for radiation of said directional signal energy modulated by pulse patterns, a plurality of receivers connected to the receiving antennas for detection of the pulse patterns modulating the signal energy radiated from the external source, directional indicating means for signifying reception of said directional signal energy from the external source within the sector zones, and pulse recognizing means connected between the receivers and the directional indicating means for operation of the indicating means only in response to reception of pulse modulated signal energy from said external source, said transmitting antennas being operative to radiate signal energy modulated by at least two different pulse patterns forwardly and rearwardly of the craft respectively.

2. The combination of claim 1 including additional indicator means connected to the pulse recognizing means for distinguishing between said different pulse patterns detected by the receivers.

3. The combination of claim 2 wherein the pulse recognizing means includes a first logic device connected to each of said receivers for accepting one of the pulse patterns and a second logic device connected to one of the receivers for accepting the other of the pulse patterns.

4. The combination of claim 3 wherein the indicating means includes a plurality of visual indicators representing the sector zones, driver means connecting the pulse recognizing means to said visual indicators, and audible alarm, and gate means connecting the driver means to the audible alarm for operation thereof in response to operation of any one of the visual indicators.

5. The combination of claim 4 wherein the indicating means further includes a visual alerting device, and mode selection means for simultaneously operating the visual alerting device and disabling the audible alarm.

6. The combination of claim 5 wherein the transmitter means includes a pulse generator producing a repeating train of output pulses, signal generating means providing a carrier signal modulated by said output pulses, and switch means for alternately connecting the signal generating means to the transmitting antennas to separate the train of pulses into two different groups of pulses respectively radiated by said transmitting antennas constituting the two different pulse patterns.

7. The combination of claim 1 wherein the pulse recognizing means includes a first logic device connected to each of said receivers for accepting one of the pulse patterns and a second logic device connected to one of the receivers for accepting the other of the pulse patterns.

8. The combination of claim 7 wherein the transmitter means includes a pulse generator producing a repeating train of output pulses, signal generating means providing a carrier signal modulated by said output pulses, and switch means for alternately connecting the signal generating means to the transmitting antennas to separate the train of pulses into two different groups of pulses respectively radiated by said transmitting antennas constituting the two different pulse patterns.

9. In a collision warning system for moving craft wherein each of said craft has a plurality of transmitting antennas radiating directional signal energy forwardly and rearwardly of the craft and a plurality of receiving antennas arranged for reception of directional signal energy from an external source within circumferential sector zones centered at the craft, said external source being the transmitting antennas on another of the craft of the system, transmitter means connected to said transmitting antennas for radiation of said directional signal energy modulated by pulse patterns, a plurality of receivers connected to the receiving antennas for detection of the pulse patterns modulating the signal energy radiated from the external source, directional indicating means for signifying reception of said directional signal energy from the external source within the sector zones, and pulse recognizing means connected between the receivers and the directional indicating means for operation of the indicating means only in response to reception of pulse modulated signal energy from said external source, said transmitter means including a pulse generator producing a repeating train of output pulses, signal generating means providing a carrier signal modulated by said output pulses, and switch means for alternately connecting the signal generating means to the transmitting antennas to separate the train of pulses into two different groups of pulses.

10. The combination of claim 9 wherein the indicating means includes a plurality of visual indicators representing the sector zones, driver means connecting the pulse recognizing means to said visual indicators, an audible alarm, and gate means connecting the driver means to the audible alarm for operation thereof in response to operation of any one of the visual indicators.

11. In a collision warning system for moving craft wherein each of said craft has a plurality of transmitting antennas radiating directional signal energy forwardly and rearwardly of the craft and a plurality of receiving antennas arranged for reception of directional signal energy from an external source within circumferential sector zones centered at the craft, said external source being the transmitting antennas on another of the craft of the system, means for modulating the signal energy radiated forwardly and rearwardly respectively from the transmitting antennas by different groups of repeating pulses at a predetermined repetition rate, means connected to each of the receiving antennas for detection of the pulse modulated signal energy radiated from the external source, logic means connected to each of the detection means for accepting one of said groups of pulses repeated at least two times at said predetermined repetition rate, and indicating means connected to the logic means for signifying detection of signal energy from said external source within any one of the sector zones in response to acceptance of said one of the groups of pulses by an associated one of the logic means.

12. The combination of claim 11 including means for indicating reception of signal energy in one of the sector zones when modulated by the other of the groups of pulses at said repetition rate.

13. In a collision warning system for moving craft wherein each of said craft has at least one directional transmitting antenna radiating directional signal energy and a plurality of receiving antennas arranged for reception of directional signal energy from an external source within circumferential sector zones centered at the craft, said external source being the transmitting antennas on another of the craft of the system, means for pulse modulating the signal energy radiated from the transmitting antenna with a direction identifying code, a receiver connected to each of the receiving antennas, directional indicating means for signifying reception of said directional signal energy from the external source within the sector zones, and pulse recognizing means connected between the receivers and the directional indicating means for operation of the indicating means only in response to reception of pulse modulated signal energy from said external source.

14. The combination of claim 13 wherein said transmitting antenna radiates the directional signal energy forwardly of the craft and the external source is on an approaching craft.

15. The combination of claim 13 wherein said transmitting antenna radiates the directional signal energy rearwardly of the craft and the external source is on another craft being overtaken.

16. In a collision avoidance system for moving craft, a plurality of directional radiating devices mounted on each of said craft, respectively, emitting signals modulated by different directional identifying codes, signal receiving means mounted on one of the craft for detecting signals emitted from the radiating devices on another of the craft nearby, indicating means connected to the receiving means for registering directional proximity of the other of the craft, and logic means connected to the receiving means and responsive to said directional identifying codes modulating the signals detected for distinguishing between different identifying codes.

17. The combination of claim 16 wherein said directional identifying codes are pulse patterns, said directional identifying codes corresponding to head-on approach, overtaking approach and departure relationships between the moving craft.

* * * * *